United States Patent
Herzel

(10) Patent No.: US 9,438,845 B2
(45) Date of Patent: Sep. 6, 2016

(54) SYSTEM APPARATUS AND DEVICE FOR FACILITATING NETWORK EDGE DEVICE BACKUP AND METHODS OF OPERATION THEREOF

(71) Applicant: Roni Herzel, Tel Aviv (IL)

(72) Inventor: Roni Herzel, Tel Aviv (IL)

(73) Assignee: ENERGY RE-CONNECT LTD., Tel Aviv (IL)

( * ) Notice: Subject to any disclaimer, the term of this patent is extended or adjusted under 35 U.S.C. 154(b) by 274 days.

(21) Appl. No.: 14/082,152

(22) Filed: Nov. 17, 2013

(65) Prior Publication Data

US 2014/0139664 A1   May 22, 2014

Related U.S. Application Data

(60) Provisional application No. 61/727,713, filed on Nov. 18, 2012.

(51) Int. Cl.

| | |
|---|---|
| *G06F 1/30* | (2006.01) |
| *H04L 12/10* | (2006.01) |
| *H04N 5/63* | (2006.01) |
| *H04N 5/765* | (2006.01) |
| *H04N 5/77* | (2006.01) |
| *H04N 5/232* | (2006.01) |
| *G06F 1/26* | (2006.01) |

(52) U.S. Cl.
CPC ............. *H04N 5/63* (2013.01); *G06F 1/266* (2013.01); *G06F 1/30* (2013.01); *H04L 12/10* (2013.01); *H04N 5/23241* (2013.01); *H04N 5/765* (2013.01); *H04N 5/772* (2013.01)

(58) Field of Classification Search
CPC .... H04N 5/63; H04N 5/23241; H04N 5/765; H04N 5/772; G06F 1/266; H04L 12/10
See application file for complete search history.

(56) References Cited

U.S. PATENT DOCUMENTS

| | | | | |
|---|---|---|---|---|
| 6,496,105 | B2 * | 12/2002 | Fisher ................... | H04B 3/542 340/13.22 |
| 7,294,940 | B2 * | 11/2007 | Grolnic .................... | G06F 1/30 307/22 |
| 2006/0026162 | A1 * | 2/2006 | Salmonsen ....... | G06F 17/30035 |
| 2007/0025712 | A1 * | 2/2007 | Jezierski ................ | H04N 5/232 396/56 |
| 2008/0294917 | A1 * | 11/2008 | Khan .................... | G06F 1/3209 713/310 |
| 2012/0236154 | A1 * | 9/2012 | Schaff .............. | G08B 13/19656 348/159 |

* cited by examiner

*Primary Examiner* — Thai Tran
*Assistant Examiner* — Christopher T Braniff
(74) *Attorney, Agent, or Firm* — Vladimir Sherman; Professional Patent Solutions

(57) ABSTRACT

Disclosed is a system apparatus and device for facilitating backup of network edge devices, such as video cameras, and methods of operation thereof. A monitoring circuit(s) may detect inoperable electrical power condition(s) (IEPC) on the power-line of a network edge device. Upon detection of an IEPC, a backup power source may provide electrical power to the edge device. Upon detection of a connectivity fault between the edge device and its packet sink, a packet sink emulator may emulate a packet sink of the edge device.

21 Claims, 18 Drawing Sheets

Contingency Power and Battery Recharge

SYSTEM APPARATUS AND DEVICE FOR FACILITATING NETWORK EDGE DEVICE BACKUP AND METHODS OF OPERATION THEREOF

PRIORITY CLAIMS

The present application claims priority from U.S. Provisional Patent Application No. 61/727,713, entitled: "A System Apparatus and Device for Facilitating Network Camera Backup and Methods of Operation Thereof", filed by the inventor of the present application on Nov. 18, 2012, which is hereby incorporated by reference into the present application in its entirety.

FIELD OF THE INVENTION

The present invention generally relates to the field of Power over Ethernet (hereinafter: 'PoE') and Network gear for Edge Device facilitation. More specifically, the present invention relates to systems apparatuses and devices for facilitating network edge device backup and continuous operation, and methods of operation thereof.

BACKGROUND

An Internet protocol camera, or IP camera, is a type of digital video camera commonly employed for surveillance, and which, unlike analog closed circuit television (CCTV) cameras, can send and receive data via a computer network and the Internet. Although most cameras that do this are webcams, the term "IP camera" or "netcam" is usually applied only to those used for surveillance.

There are two kinds of IP cameras:

Centralized IP cameras, which require a central Network Video Recorder (NVR) to handle the recording, video and alarm management.

Decentralized IP cameras, which do not require a central Network Video Recorder (NVR), as the cameras have recording functionality built-in and can thus record directly to digital storage media, such as flash drives, hard disk drives or network attached storage.

The first centralized IP camera was released in 1996 by Axis Communications. It was called the Axis Neteye 200 and was developed by the team of Martin Gren and Carl-Axel Alm. It used a custom web server internal to the camera. In late 1999, the company started using embedded Linux to operate its cameras. Axis also released documentation for its low-level API called "VAPIX", which builds on the open standards of HTTP and real time streaming protocol (RTSP). This open architecture was intended to encourage third-party software manufacturers to develop compatible management and recording software.

The first decentralized IP camera was released in 1999 by Mobotix. The camera's Linux system contained video, alarm and recording management functionality, thus the camera system did not require licensed video management software to manage the recording, event and video management.

The first IP camera with onboard video content analytics (VCA) was released in 2005 by Intellio. This camera was capable of detecting a number of different events, such as an object was stolen, a human crosses a line, a human entered a predefined zone, a car goes the wrong way.

IP cameras are available at resolutions from 0.3 (VGA resolution) to 20 megapixels. As in the consumer TV business, in the early 21st century, there has been a shift towards high-definition video resolutions, e.g. 720p or 1080i and 16:9 widescreen format.

Taking the above into account, there clearly remains a need, in the field of network and IP Cameras, for better more efficient systems, apparatuses, devices and methods for network camera backup, and other network edge device backup, that may allow for network cameras and other network edge device to continue their operation while coping with various power, communication, storage and tampering scenarios.

SUMMARY OF THE INVENTION

Below are described a number of novel, innovative features of a system apparatus and device for facilitating network edge device (e.g. camera) backup and methods of operation thereof.

According to some embodiments of the present invention, an apparatus/device for facilitating network camera backup may be positioned between a networked camera (e.g. in or next to camera housing) and the network side of the camera to/from which data is communicated and from which regular electric power is supplied to the camera (e.g. data and power as PoE).

According to some embodiments of the present invention, the apparatus/device for facilitating network camera backup may comprise: a First PoE Splitter/Adaptor, on the network side of the apparatus/device, for separating the PoE provided data and power connections; a Power Monitoring Module for monitoring the quality and extracting electric parameters of electric power supplied by a regular power source; Decision Logic for determining, based on the extracted electric parameters, if a drop in power quality has occurred and issuing a respective power source switching command; a Power Management Module including: a Charging Circuit for charging of a Contingency Power Source and a Backup Supply Circuit for switching from the regular power source to the Contingency Power Source, in response to a power source switching command from the decision logic; and a Second PoE Splitter/Adaptor, on the camera side of the apparatus/device, for merging the separated data connection and the power connection of the contingency power source and relaying as PoE to the camera.

According to some embodiments of the present invention, the apparatus/device for facilitating network camera backup may be implemented as an independent unit that may be positioned within the housing of a network camera and/or outside the housing, and possibly in substantial proximity to it, on the network side of the camera. According to some embodiments, the apparatus/device for facilitating network camera backup may be implemented as an integral, or partially integral, part of a network camera such that at least some of the components of the apparatus are integrated and/or embedded into camera circuit boards (e.g. main circuit board) also handling other camera operation related functionalities. Any of the features described hereinafter, or parts thereof, may be at least partially implemented by either: a network camera comprising integrated network camera backup functionalities and/or a standalone network camera backup apparatus functionally associated with a network camera.

Furthermore, the present invention may be implemented in various infrastructure, power, communication, and cabling environments. Accordingly, a variety of media converters and/or adapters, for switching between different physical Medias and/or converting analog signals/data to digital format and vice versa, may be used as part of many connection configurations of an apparatus in accordance with the present invention. According to some exemplary embodiments, a media converter may convert signal(s) travelling over fiber-optic, Coax, RJ45 and/or any other type of data carrying medium (e.g. cables) known today or to be devised in the future, to Ethernet compatible medium that may also be used for carrying power (e.g. PoE). An apparatus/device for facilitating network camera backup may, accordingly, comprise a media converter on its network side to convert network data signals of other medium types to over Ethernet signals; and/or a media converter on its camera side to convert camera data signals of other medium types to over Ethernet signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

DETAILED DESCRIPTION

Figure 1:
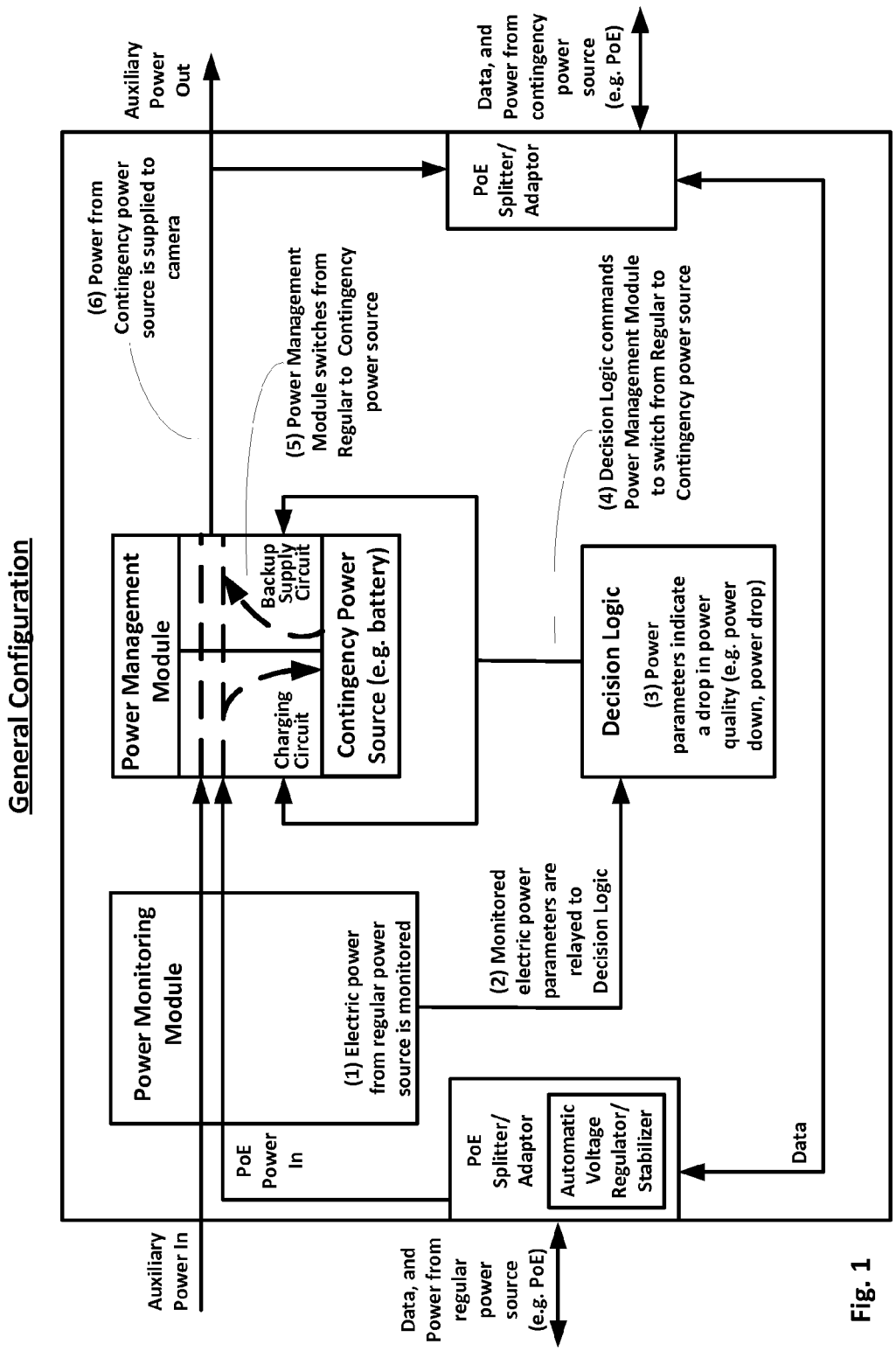
FIG. 1 is a block diagram showing the main modules and operation steps of an exemplary system for facilitating network camera backup, in accordance with some embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing". "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmnable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The processes and displays presented herein, although generally directed to the backup of cameras and/or IP cameras, are not inherently related to any particular camera or electric equipment type. Various general-purpose systems and/or apparatuses may be used in accordance with the teachings herein, or it may prove convenient to construct a more specialized apparatus, to facilitate the backup of any type of PoE, or non-PoE, edge device, known today or to be devised in the future. The desired structure for a variety of these systems will appear from the description below. Such edge devices may include, but are in no way limited to: IP cameras, Wifi APs, IP phones, ADSL and cable modems, Media converters, IP PBXs, Access control controllers and ID readers, IP intercoms; and/or any edge device, known today or to be devised in the future.

General

The present invention is a system, apparatus, and device for facilitating network camera backup and methods of operation thereof. According to some embodiments of the present invention, an apparatus/device for facilitating network camera backup may be positioned between a networked camera (e.g. in or next to camera housing) and the network side of the camera to/from which data is communicated and from which regular electric power is supplied to the camera (e.g. data and power as PoE).

According to some embodiments of the present invention, the apparatus/device for facilitating network camera backup may comprise: a First PoE Splitter/Adaptor, on the network side of the apparatus/device, for separating the PoE provided data and power connections; a Power Monitoring Module for monitoring the quality and extracting electric parameters of electric power supplied by a regular power source; Decision Logic for determining, based on the extracted electric parameters, if a drop in power quality has occurred and issuing a respective power source switching command; a Power Management Module, including a Charging Circuit for charging of a Contingency Power Source and a Backup Supply Circuit for switching from the regular power source to the Contingency Power Source, in response to a power source switching command from the decision logic; and/or a Second PoE Splitter/Adaptor, on the camera side of the apparatus/device, for merging the separated data connection and the power connection of the contingency power source and relaying as PoE to the camera.

According to some embodiments of the present invention, the apparatus/device for facilitating network camera backup may be implemented as an independent unit that may be positioned within the housing of a network camera, and/or outside the housing, and possibly in substantial proximity to it, on the network side of the camera. According to some embodiments, the apparatus/device for facilitating network camera backup may be implemented as an integral, or partially integral, part of a network camera such that at least some of the components of the apparatus are integrated and/or embedded into camera circuit boards (e.g. main circuit board) also handling other camera operation related functionalities. Any of the features described hereinafter, or parts thereof, may be at least partially implemented by either: a network camera comprising integrated network camera backup functionalities and/or a standalone network camera backup apparatus functionally associated with a network camera.

Furthermore, the present invention may be implemented in various infrastructure, power, communication, and cabling environments. Accordingly, a variety of media converters and/or adapters, for switching between different physical medias and/or converting analog signals/data to digital format and vice versa, may be used as part of many connection configurations of an apparatus in accordance with the present invention. According to some exemplary embodiments, a media converter may convert signal(s) travelling over fiber-optic. Coax, RJ45 and/or any other type of data carrying medium (e.g. cables) known today or to be devised in the future, to Ethernet compatible medium that may also be used for carrying power (e.g. PoE). An apparatus/device for facilitating network camera backup may, accordingly, comprise a media converter on its network side to convert network data signals of other medium types to over Ethernet signals; and/or a media converter on its camera side to convert camera data signals of other medium types to over Ethernet signals.

According to some embodiments of the present invention, the system/apparatus/device may comprise, or be functionally associated with an AVR/S (Automatic Voltage Regulator/Stabilizer) for protecting against power surges, spikes and/or noise. An AVR/S may be implemented as part of the invention system/apparatus/device in order to protect the camera, camera recorded data, and/or other system components, from lightning or power-grid originating, potentially damaging, power scenarios.

In FIG. 1 there are shown, in accordance with some embodiments of the present invention, the main modules and operation steps of an exemplary system/apparatus for facilitating network camera backup, in accordance with some embodiments of the present invention.

Contingency Power and Battery Recharge

According to some embodiments of the present invention, the contingency power source may be a battery; according to some embodiments, the contingency power source may be a rechargeable battery. The apparatus/device may comprise: a Contingency Power Source Charging Module for using external and/or internal electric power from the regular power source (i.e. while available)—PoE, and/or Auxiliary Power—for charging the rechargeable battery contingency power source. According to some embodiments, the Power Management Module may switch between the regular power source (e.g. PoE line) and two or more contingency power sources, in response to a power source switching command from the decision logic. For example, the Power Management Module may initially switch to an auxiliary backup power source—in response to a drop in power quality in the regular power source, and may later switch to a rechargeable battery backup power source—in response to a drop in power quality in the auxiliary backup power source.

Figure 2:
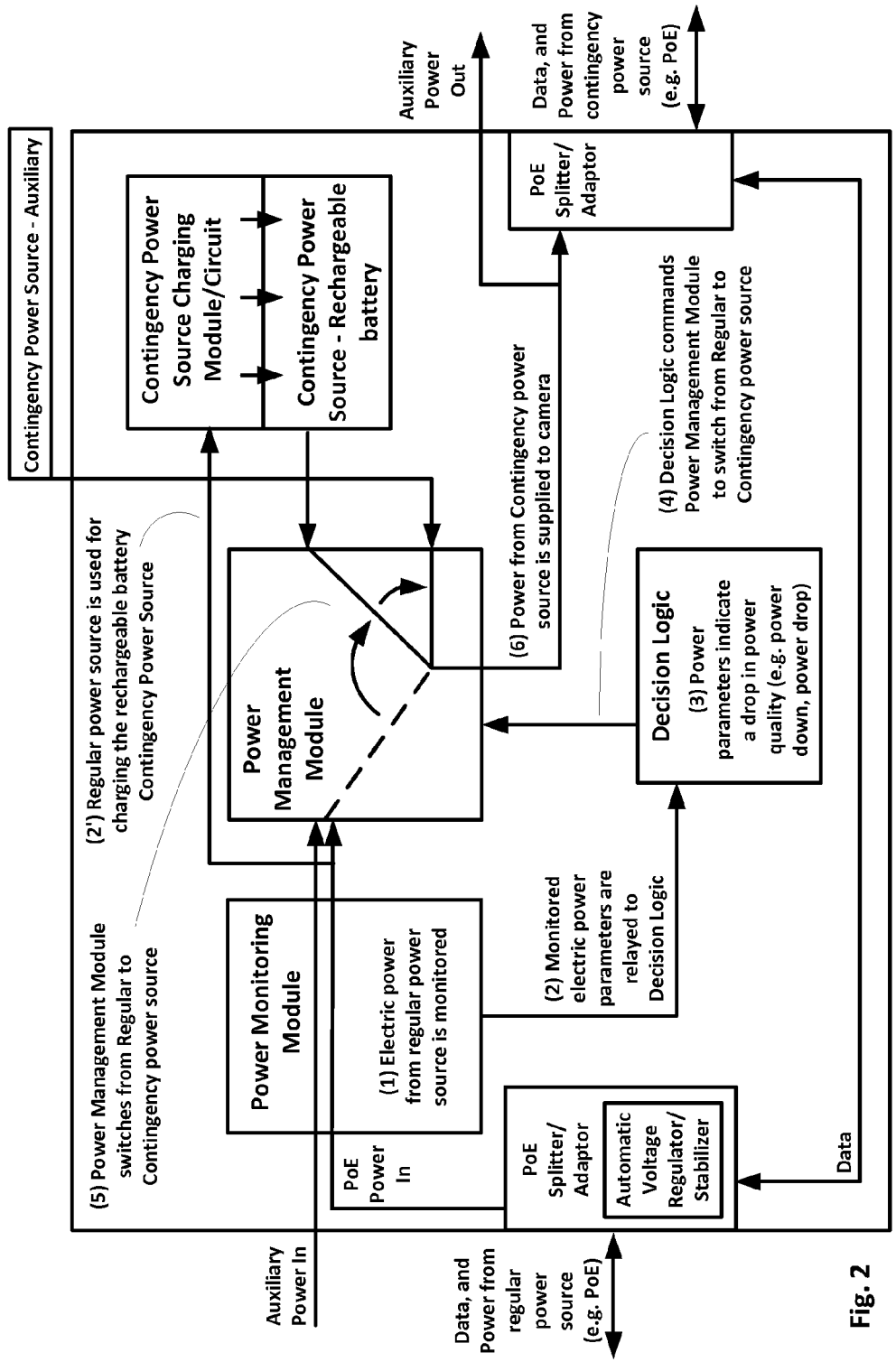
FIG. 2 is a block diagram showing the main modules and operation steps of an exemplary system for facilitating network camera backup, comprising a rechargeable battery as its contingency powers source, in accordance with some embodiments of the present invention.

In FIG. 2 there are shown, in accordance with some embodiments of the present invention, the main modules and operation steps of an exemplary system/apparatus for facilitating network camera backup, comprising a rechargeable battery as its contingency powers source and a power management module for switching between a regular power source and two contingency power sources.

Local Storage

According to some embodiments of the present invention, the decision logic, upon determining based on the extracted electric parameters that a drop in power quality has occurred, may issue a respective data storage switching command to a Data Communication and Storage Management Module. In response, the Data Communication and Storage Management Module may switch from the regular storage destination/sink (e.g. remote) to a Local Storage Module (e.g. an SD card). According to some embodiments, an Ethernet Replacement (e.g. IP mirror substitute) may be used as a substitute for the network destination/sink (e.g. an IP address) to which the camera regularly (i.e. under good power quality conditions) relays its data.

It is hereby made clear that any local/contingency/secondary storage module of the present invention, may be implemented using: magnetic, optical, read-only memories (ROMs), random access memories (RAMs), electrically programmable read-only memories (EPROMs), electrically erasable and programmable read only memories (EEPROMs), Flash memory, and/or any other type of media suitable for storing electronic instructions, and capable of being coupled to a computer system bus.

Figure 3:
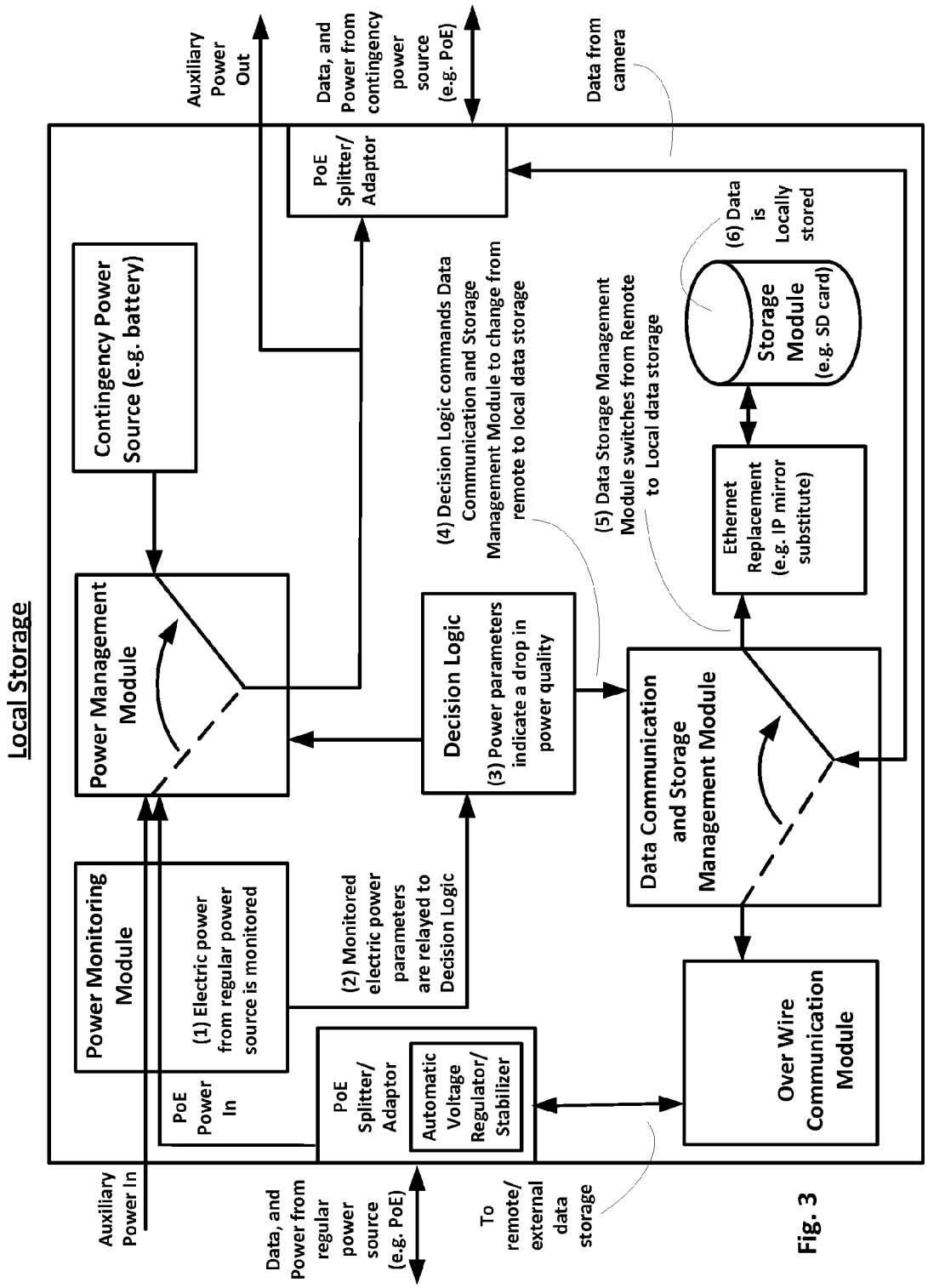
FIG. 3 is a block diagram showing the main modules and operation steps of an exemplary system for facilitating network camera backup, comprising a local data storage module, in accordance with some embodiments of the present invention.

In FIG. 3 there are shown, in accordance with some embodiments of the present invention, the main modules and operation steps of an exemplary system/apparatus for facilitating network camera backup, comprising a local data storage module.

Wireless Storage Access

According to some embodiments of the present invention, the decision logic, upon determining based on the extracted electric parameters that a drop in power quality has occurred, may issue a respective data storage switching command to the Data Communication and Storage Management Module. In response, the Data Communication and Storage Management Module may switch from the regular storage destination/sink (e.g. remote) to a Networked Storage Module accessed through a Wireless Communication Module (e.g. Wi-Fi, Cellular). According to some embodiments, the Ethernet Replacement (e.g. IP mirror substitute) may be used as a substitute for the network destination/sink (e.g. an IP address) to which the camera regularly (i.e. under good power quality conditions) relays its data.

Figure 4:
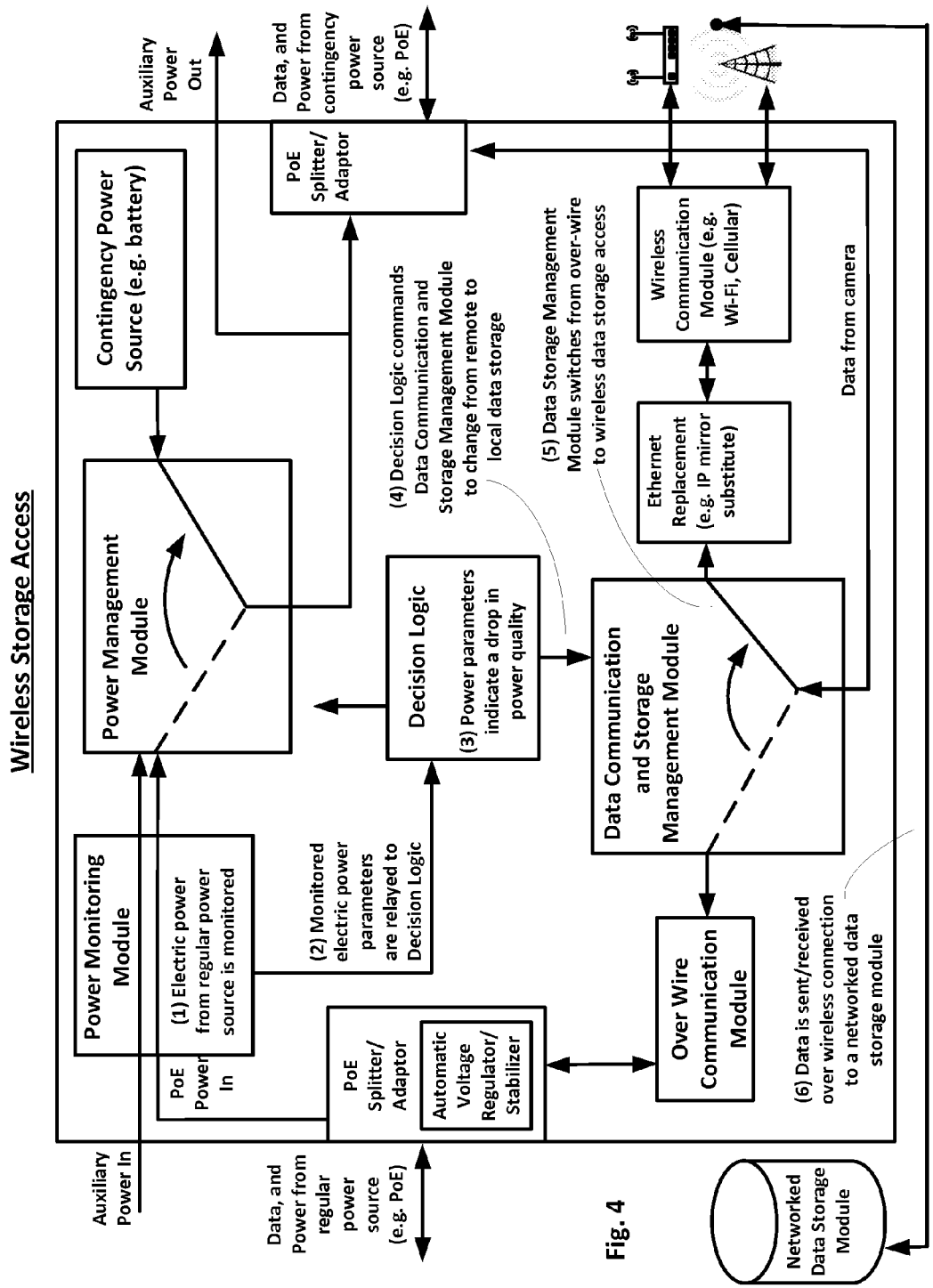
FIG. 4 is a block diagram showing the main modules and operation steps of an exemplary system for facilitating network camera backup, comprising a wirelessly accessed network data storage module, in accordance with some embodiments of the present invention.

In FIG. 4 there are shown, in accordance with some embodiments of the present invention, the main modules and operation steps of an exemplary system/apparatus for facilitating network camera backup, comprising a wirelessly accessed network data storage module.

Degraded Data Quality Storage

According to some embodiments of the present invention, a Storage Space Monitoring Module may intermittently check the remaining storage space available on the Local Storage Module, and relay remaining space indicative data to the Decision Logic. Upon the available space decreasing to/beyond a threshold value, the decision logic may issue a command to degrade the quality of stored camera data to the Data Communication and Storage Management Module. In response, the Data Communication and Storage Management Module may degrade the quality of camera data stored, thus allowing for a longer temporal record keeping period for a similar amount of available storage space.

Figure 5:
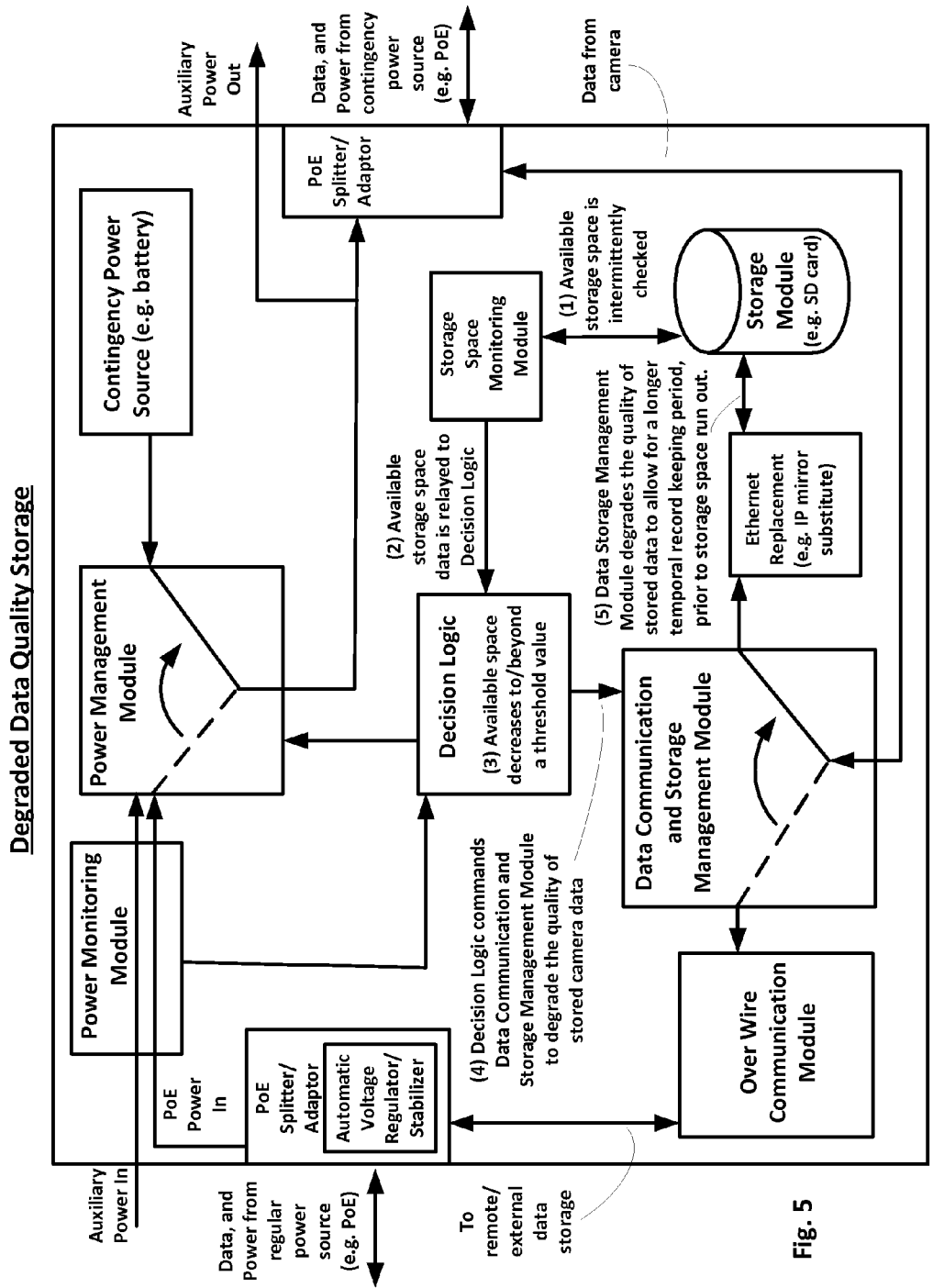
FIG. 5 is a block diagram showing the main modules and operation steps of an exemplary system for facilitating network camera backup, wherein the quality of stored data is degraded to allow for more data, or data of a longer camera operation time period, to be stored, in accordance with some embodiments of the present invention.

In FIG. 5 there are shown, in accordance with some embodiments of the present invention, the main modules and operation steps of an exemplary system/apparatus for facilitating network camera backup, wherein the quality of stored data is degraded to allow for more data, or data of a longer camera operation time period, to be stored.

Wireless Communication (Power)

According to some embodiments of the present invention, the decision logic, upon determining based on the extracted electric parameters that a drop in power quality has occurred, may issue a respective data storage switching command to the Data Communication and Storage Management Module. In response, the Data Communication and Storage Management Module may switch from its regular over wire network connection, to using the Wireless Communication Module (e.g. Wi-Fi, Cellular). According to some embodiments, the Ethernet Replacement (e.g. IP mirror substitute) may be used as a substitute for the network destination/sink (e.g. an IP address) to which the camera regularly (i.e. under good power quality conditions) relays its data.

Figure 6:
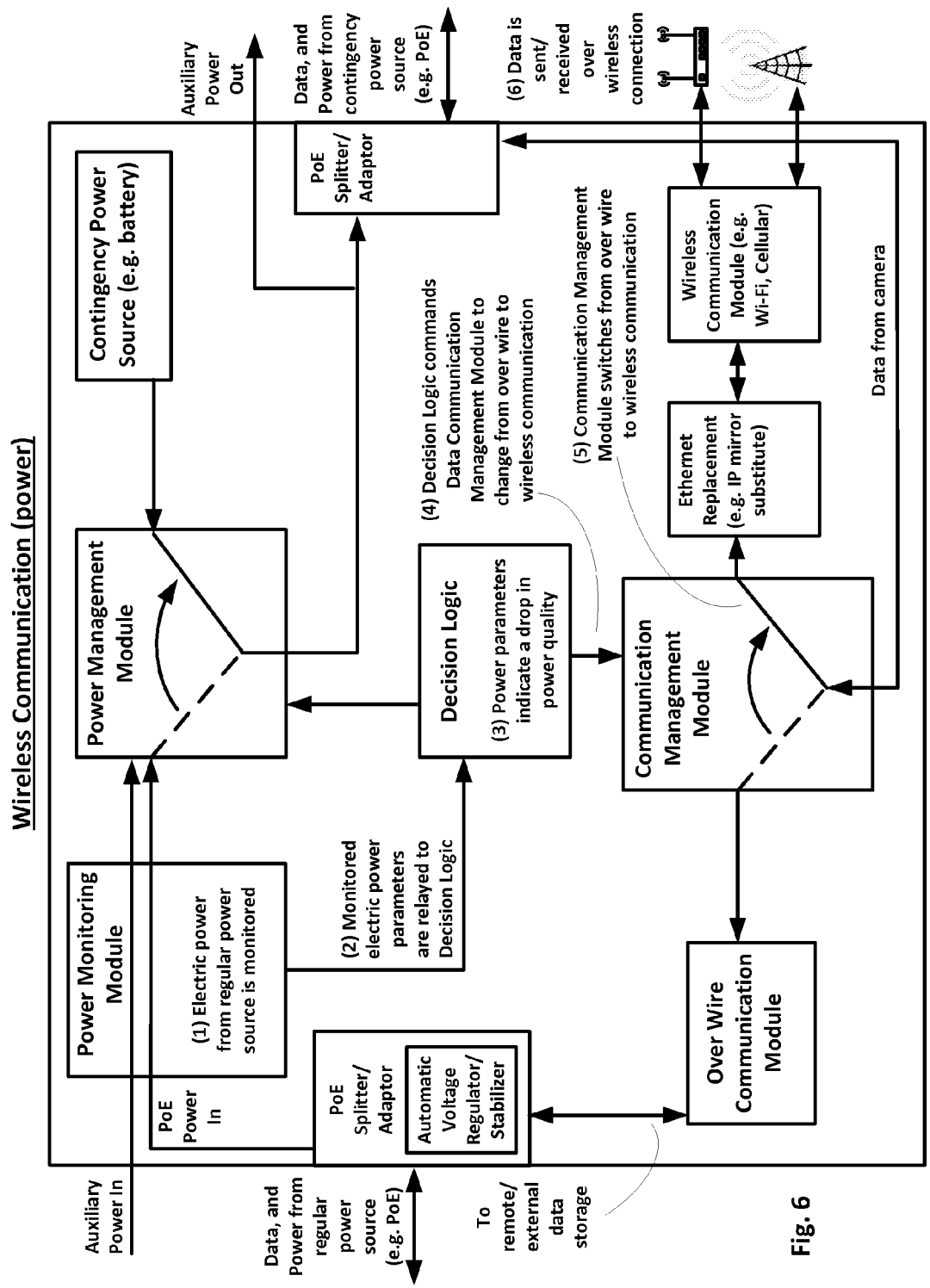
FIG. 6 is a block diagram showing the main modules and operation steps of an exemplary system for facilitating network camera backup, wherein the system switches from its regular (e.g. over wire) communication to wireless (e.g. Wi-Fi, cellular) communication as a result of a drop in power quality, in accordance with some embodiments of the present invention.

In FIG. 6 there are shown, in accordance with some embodiments of the present invention, the main modules and operation steps of an exemplary system/apparatus for facilitating network camera backup, wherein the system switches from its regular (e.g. over wire) communication, to wireless (e.g. Wi-Fi, cellular) communication, as a result of a drop in power quality.

Wireless Communication (Network)

According to some embodiments of the present invention, a Network Monitoring Module may intermittently check the quality of the regular network connection. The decision logic, upon determining based on the extracted network connection parameters that the regular connection is down/bad, may issue a respective data storage switching command to the Data Communication and Storage Management Module. In response, the Data Communication and Storage Management Module may switch from its regular over wire network connection (determined to be down/bad), to using the Wireless Communication Module (e.g. Wi-Fi, Cellular). According to some embodiments, the Ethernet Replacement (e.g. IP mirror substitute) may be used as a substitute for the network destination/sink (e.g. an IP address) to which the camera regularly (i.e. under good network connection quality conditions) relays its data.

Figure 7:
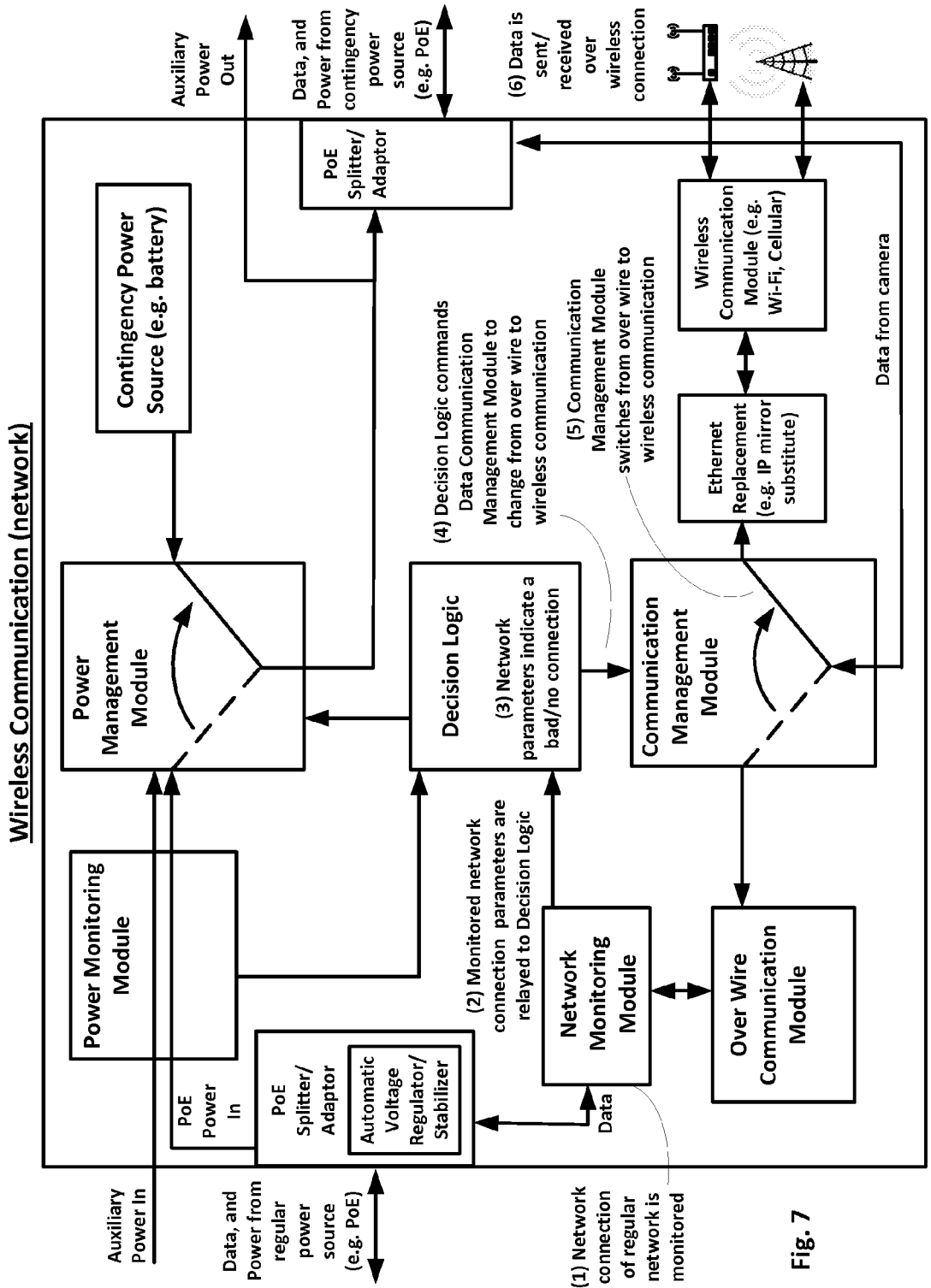
FIG. 7 is a block diagram showing the main modules and operation steps of an exemplary system for facilitating network camera backup, wherein the system switches from its regular (e.g. over wire) communication to wireless (e.g. Wi-Fi, cellular) communication as a result of a drop in the quality of its network connection, in accordance with some embodiments of the present invention.

In FIG. 7 there are shown, in accordance with some embodiments of the present invention, the main modules and operation steps of an exemplary system/apparatus for facilitating network camera backup, wherein the system switches from its regular (e.g. over wire) communication to wireless (e.g. Wi-Fi, cellular) communication as a result of a drop in the quality of its network connection.

Cellular Power Down Alert

According to some embodiments of the present invention, the decision logic, upon determining, based on the extracted electric parameters, that a drop in power quality has occurred, may issue a respective power quality drop notification/alert to the Data Communication and Storage Management Module. In response, the Data Communication and Storage Management Module may use the Wireless Communication Module (e.g. Wi-Fi, Cellular) to send a cellular notification/alert of a drop in power quality to a Camera Administrator Device (e.g. a mobile communication device). According to some embodiments, the Ethernet Replacement (e.g. IP mirror substitute) may be used as a substitute for the network destination/sink (e.g. an IP address) to which the camera regularly (i.e. under good power quality conditions) relays its data.

Figure 8:
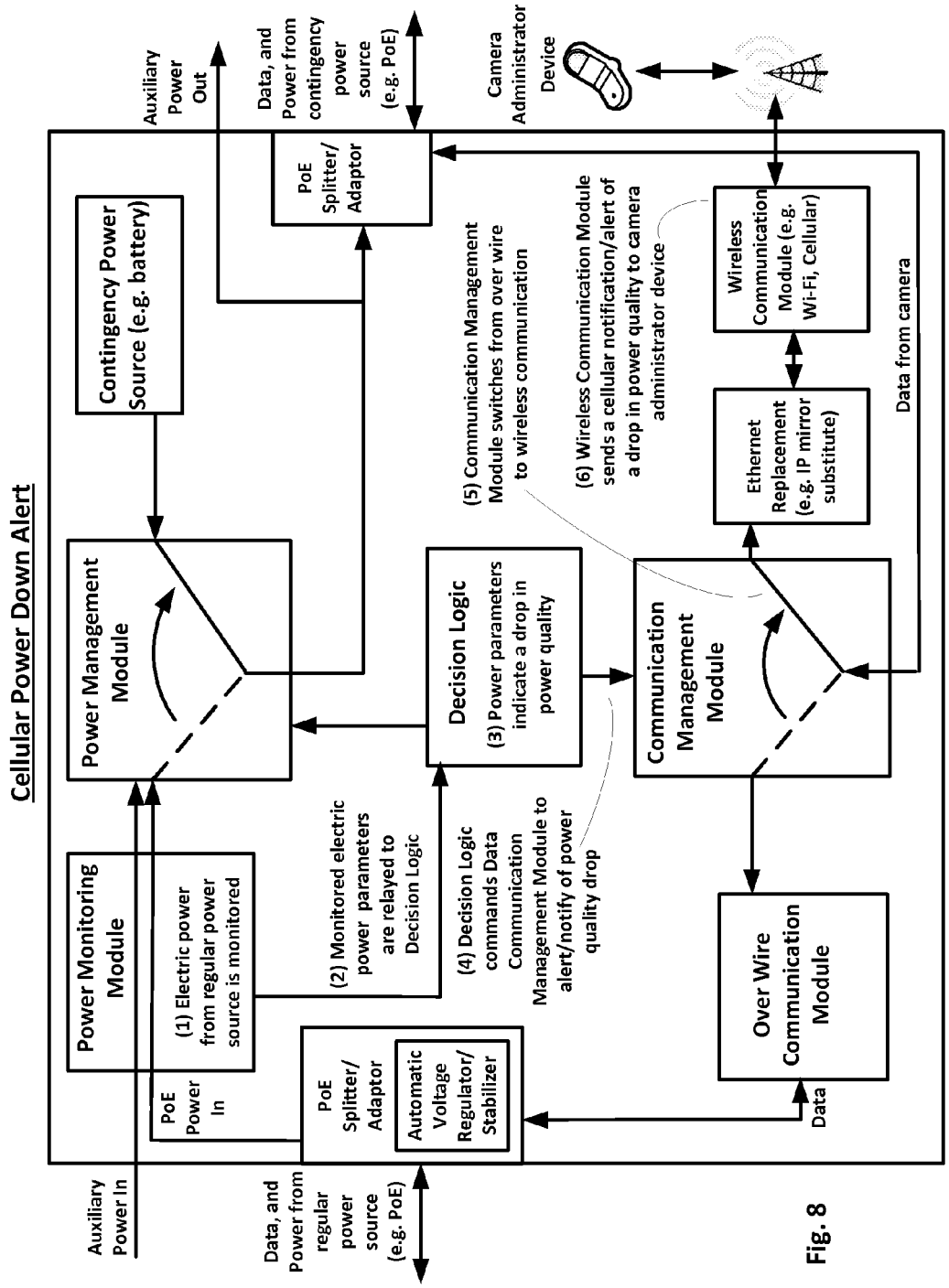
FIG. 8 is a block diagram showing the main modules and operation steps of an exemplary system for facilitating network camera backup, wherein a cellular notification/alert is sent to a mobile communication device of a network camera administrator as a result of a drop in power quality, in accordance with some embodiments of the present invention.

In FIG. 8 there are shown, in accordance with some embodiments of the present invention, the main modules and operation steps of an exemplary system/apparatus for facilitating network camera backup, wherein a cellular notification/alert is sent to a mobile communication device of a network camera administrator as a result of a drop in power quality.

Camera Power Consumption

According to some embodiments of the present invention, a Power Consumption Module may intermittently monitor the power consumption characteristics of the camera and extract power consumption related parameters. The decision logic, upon determining based on the extracted power consumption parameters that low, or no, power is being consumed by the camera, may issue a respective low/no camera power consumption notification/alert to the Data Communication and Storage Management Module. In response, the Data Communication and Storage Management Module may use the Wireless Communication Module (e.g. Wi-Fi, Cellular) to send a cellular notification/alert of low/no camera power consumption to the Camera Administrator Device (e.g. a mobile communication device). According to some embodiments, the Ethernet Replacement (e.g. IP mirror substitute) may be used as a substitute for the network destination/sink (e.g. an IP address) to which the camera regularly (i.e. under good network connection quality conditions) relays its data.

Figure 9:
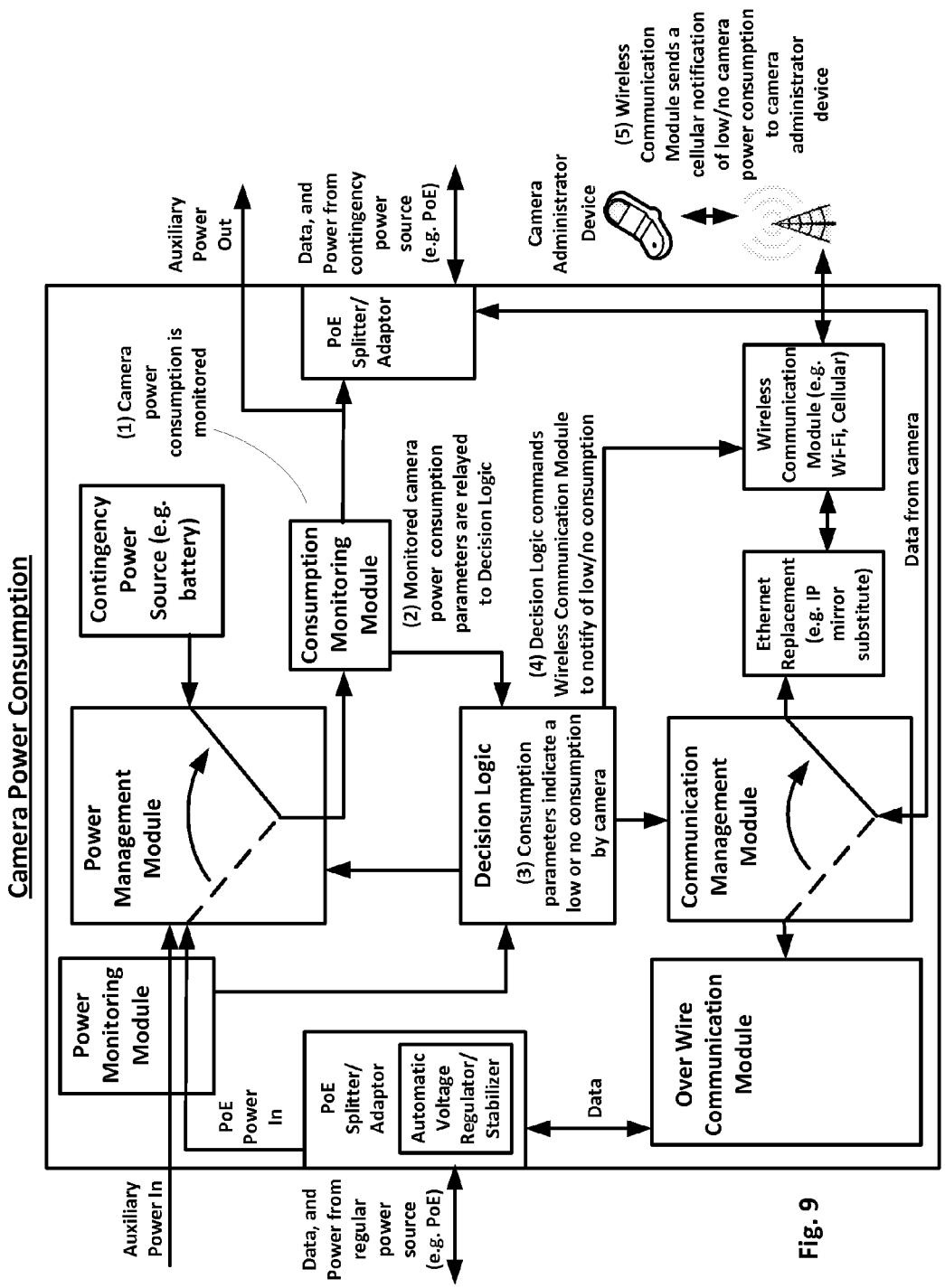
FIG. 9 is a block diagram showing the main modules and operation steps of an exemplary system for facilitating network camera backup, comprising a camera power consumption monitoring module wherein a cellular notification/alert is sent to a mobile communication device of a network camera administrator when no/low power is consumed by the camera, in accordance with some embodiments of the present invention.

In FIG. 9 there are shown, in accordance with some embodiments of the present invention, the main modules and operation steps of an exemplary system/apparatus for facilitating network camera backup, comprising a camera power consumption monitoring module, wherein a cellular notification/alert is sent to a mobile communication device of a network camera administrator when no/low power is consumed by the camera.

Camera Power Down

According to some embodiments of the present invention, the Camera Administrator Device (e.g. a mobile communication device) may send a camera power down command through the Wireless Communication Module (e.g. upon receipt of a low/no camera power consumption from the Wireless Communication Module). Camera power down command may be relayed to the Decision Logic that may issue a corresponding command to the Power Management Module to temporarily halt/decrease power supply to the camera causing no/low power to temporarily be supplied to the camera.

Figure 10:
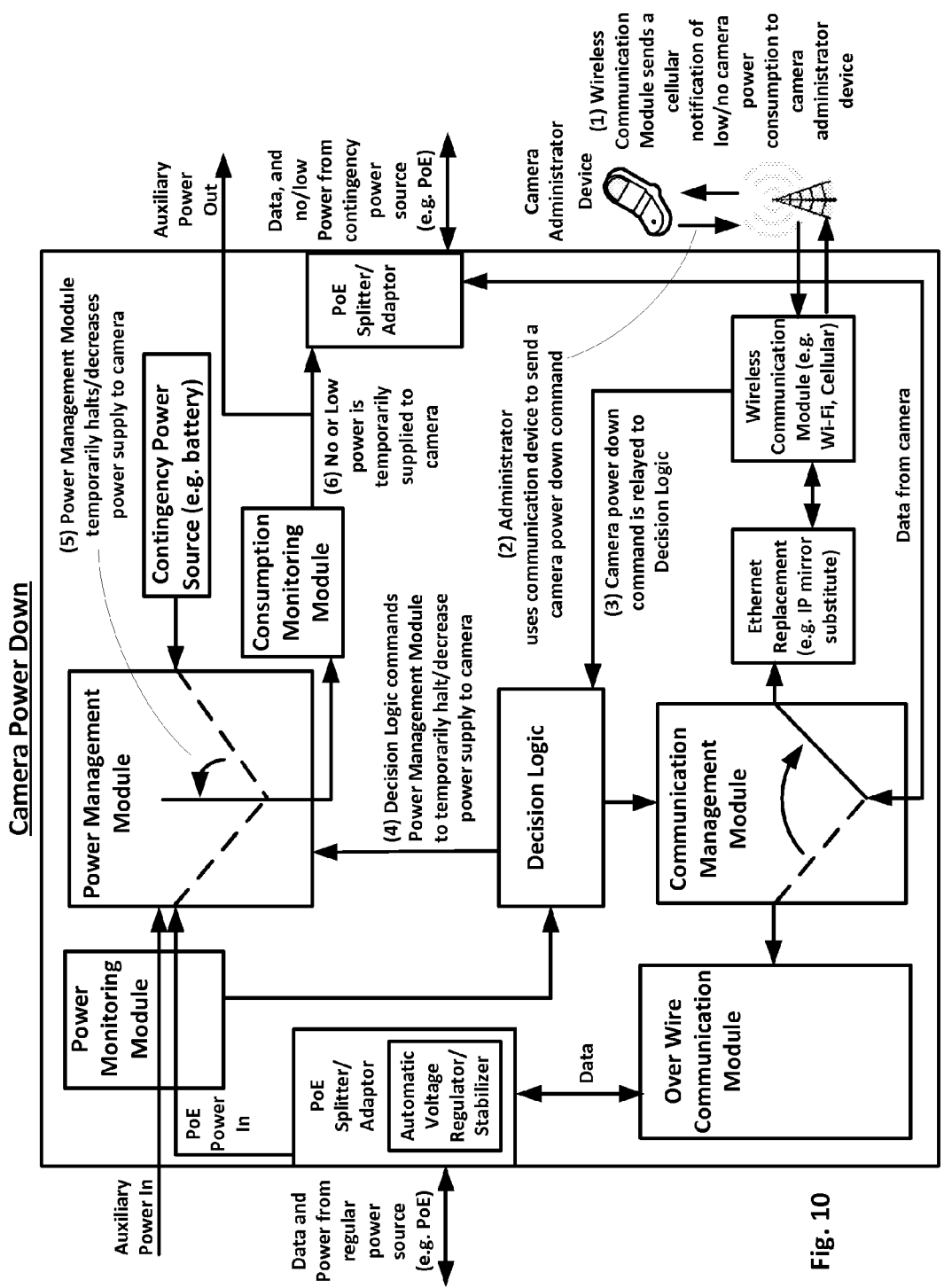
FIG. 10 is a block diagram showing the main modules and operation steps of an exemplary system for facilitating network camera backup, wherein power supply to the camera is temporarily halted/decreased as a result of a power down command from a mobile communication device of a network camera administrator, in accordance with some embodiments of the present invention.

In FIG. 10 there are shown, in accordance with some embodiments of the present invention, the main modules and operation steps of an exemplary system/apparatus for facilitating network camera backup, wherein power supply to the camera is temporarily halted/decreased as a result of a power down command from a mobile communication device of a network camera administrator.

Camera Auto Power Reset

According to some embodiments of the present invention, the Decision Logic, upon receiving camera consumption parameters indicative of low/no consumption by the camera and/or based on a temporal indication/triggering from/by a preset or dynamically-set timer, may automatically issue a corresponding command to the Power Management Module to reset/restart/boot the camera and/or temporarily halt/decrease power supply to it.

Figure 11:
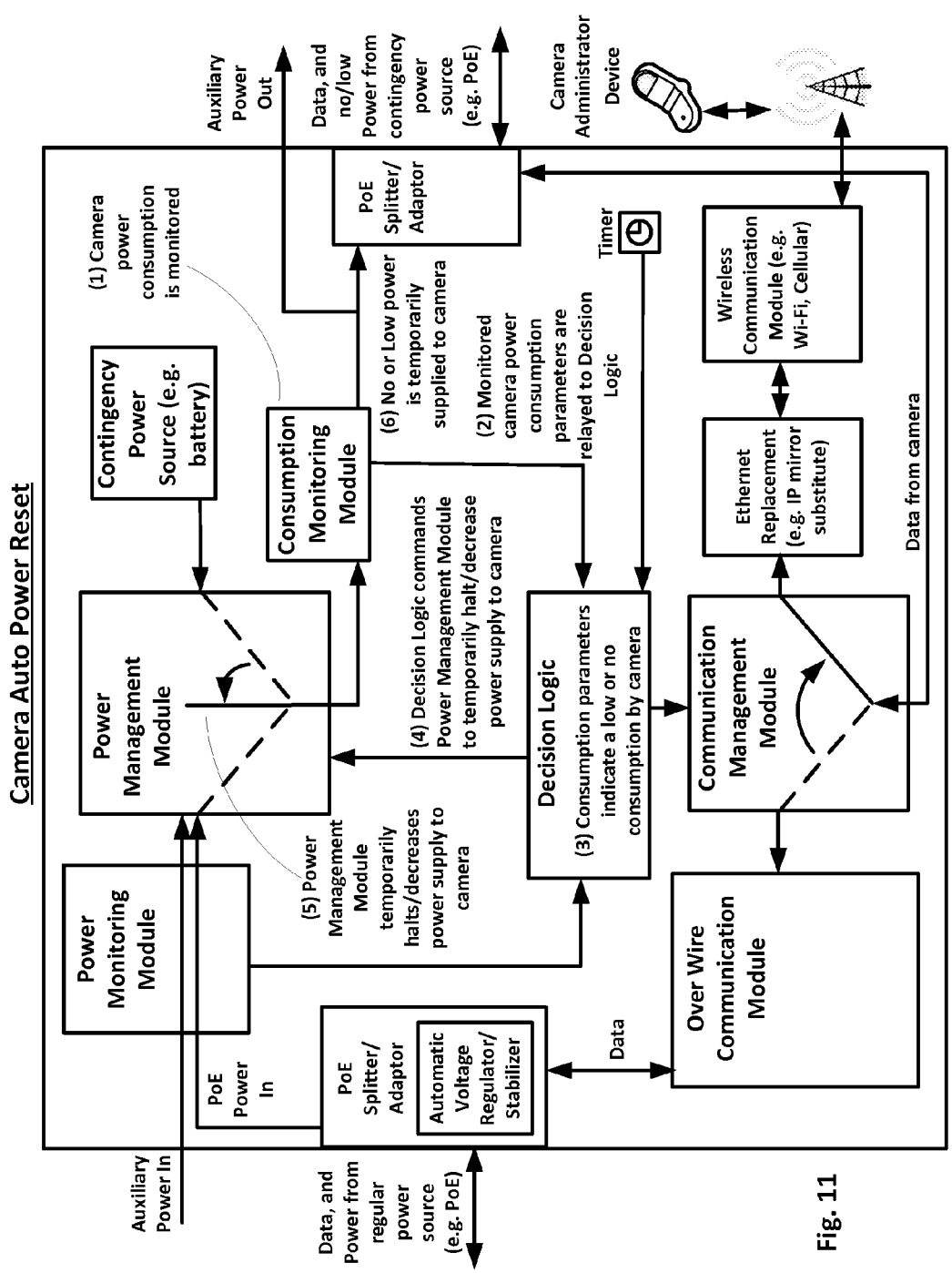
FIG. 11 is a block diagram showing the main modules and operation steps of an exemplary system for facilitating network camera backup, wherein power supply to the camera is automatically temporarily halted/decreased as a result of the camera consumption module parameters indicating low/no power consumption by the camera, in accordance with some embodiments of the present invention.

In FIG. 11 there are shown, in accordance with some embodiments of the present invention, the main modules and operation steps of an exemplary system/apparatus for facilitating network camera backup, wherein power supply to the camera is automatically temporarily halted/decreased as a result of the camera consumption module parameters indicating low/no power consumption by the camera.

Camera Video Parameters

According to some embodiments of the present invention, a Video Monitoring and Analysis Module may monitor the video data stream received from the camera. Video parameters (e.g. resolution, quality, focusing, field of view) may be extracted and relayed to the Decision Logic. The video parameters, possibly following to an initial processing stage, may be communicated to the Camera Administrator Device (e.g. a mobile communication device) through the Wireless Communication Module.

Figure 12:
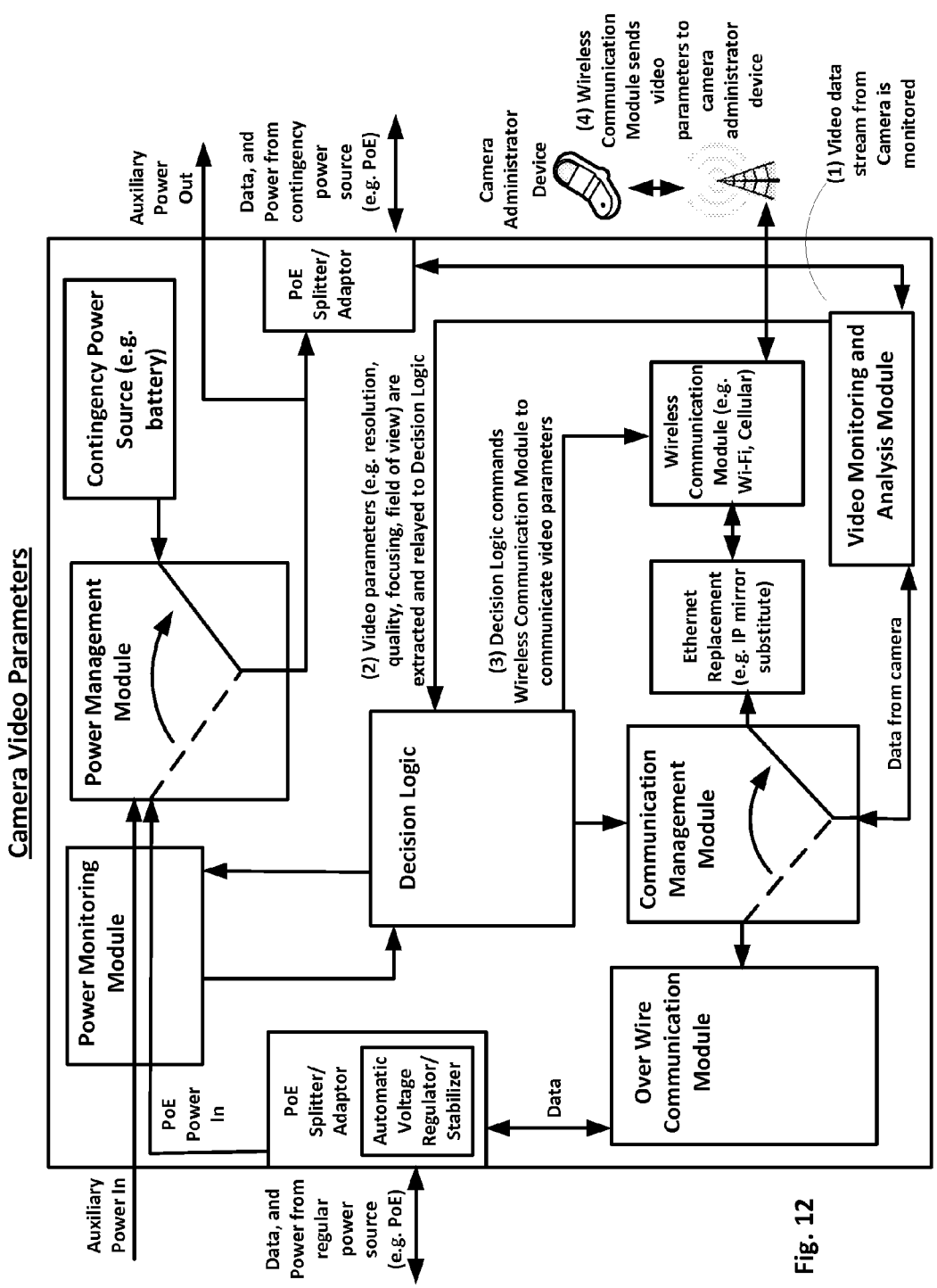
FIG. 12 is a block diagram showing the main modules and operation steps of an exemplary system for facilitating network camera backup, comprising a video monitoring and analysis module for extracting video parameters from a monitored video data stream of a camera, in accordance with some embodiments of the present invention.

In FIG. 12 there are shown, in accordance with some embodiments of the present invention, the main modules and operation steps of an exemplary system/apparatus for facilitating network camera backup, comprising a video monitoring and analysis module for extracting video parameters from a monitored video data stream of a camera.

Camera Control

According to some embodiments of the present invention, the Camera Administrator Device (e.g. a mobile communication device) may send camera control commands through the Wireless Communication Module (e.g. based on received video parameters data from the Wireless Communication Module). A Camera Control Module may receive the commands from the Control Logic and relay them to the camera.

Figure 13:
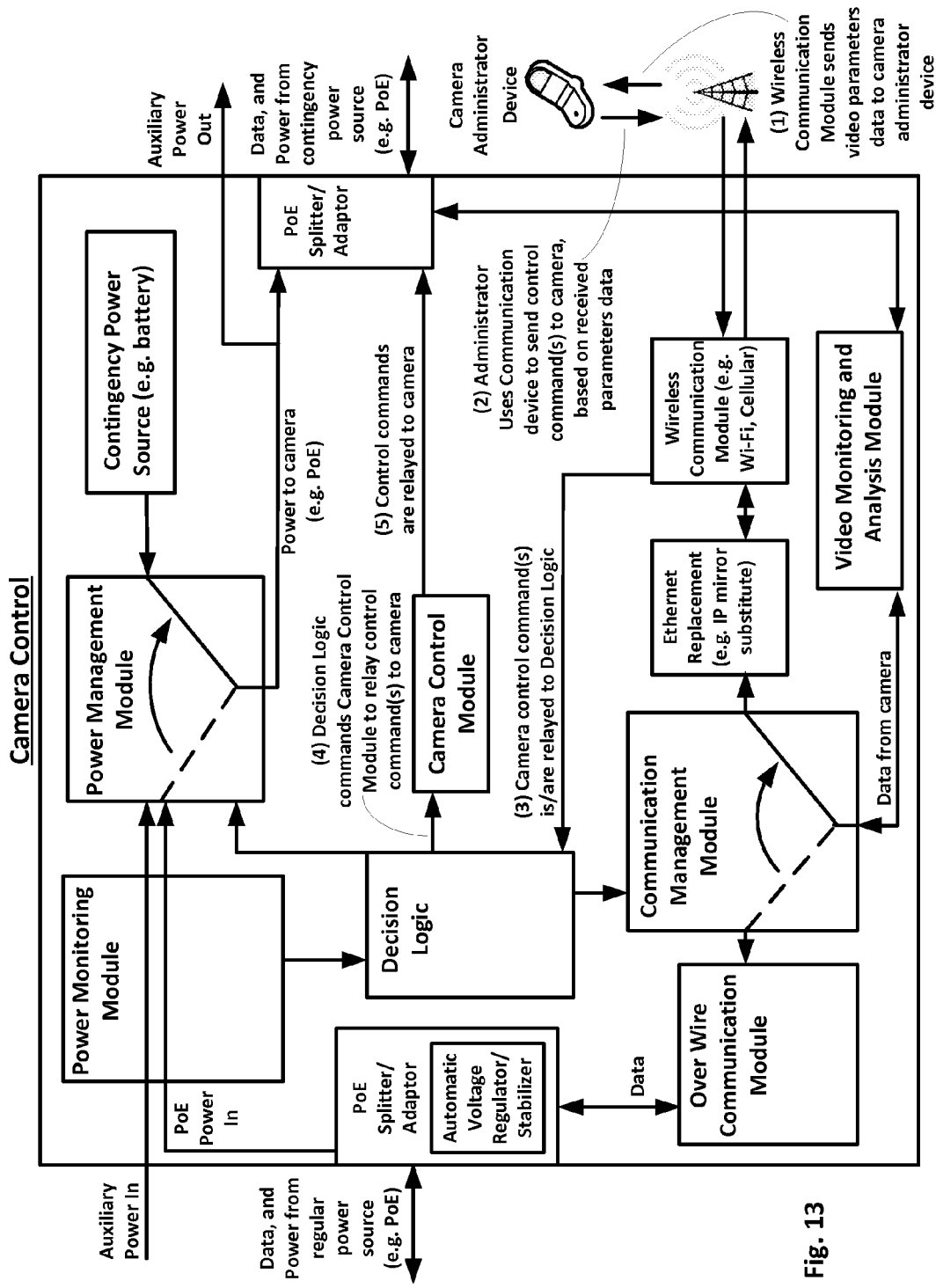
FIG. 13 is a block diagram showing the main modules and operation steps of an exemplary system for facilitating network camera backup, wherein 'video parameters data' based control commands from a mobile communication device of a network camera administrator are relayed to the camera, in accordance with some embodiments of the present invention.

In FIG. 13 there are shown, in accordance with some embodiments of the present invention, the main modules and operation steps of an exemplary system/apparatus for facilitating network camera backup, wherein 'video parameters data' based control commands from a mobile communication device of a network camera administrator are relayed to the camera.

Camera Profile Parameters

According to some embodiments of the present invention, video parameters (e.g. resolution, quality, focusing, field of view), extracted by the Video Monitoring and Analysis Module and relayed to the Decision Logic, may be compared by the Decision Logic to stored 'operation parameters profile' of the monitored camera. According to some embodiments, the Decision Logic may issue commands to the Camera Control Module, and from there to the camera, at least partially based on the results of the comparison to the 'operation parameters profile' of that camera.

Figure 14:
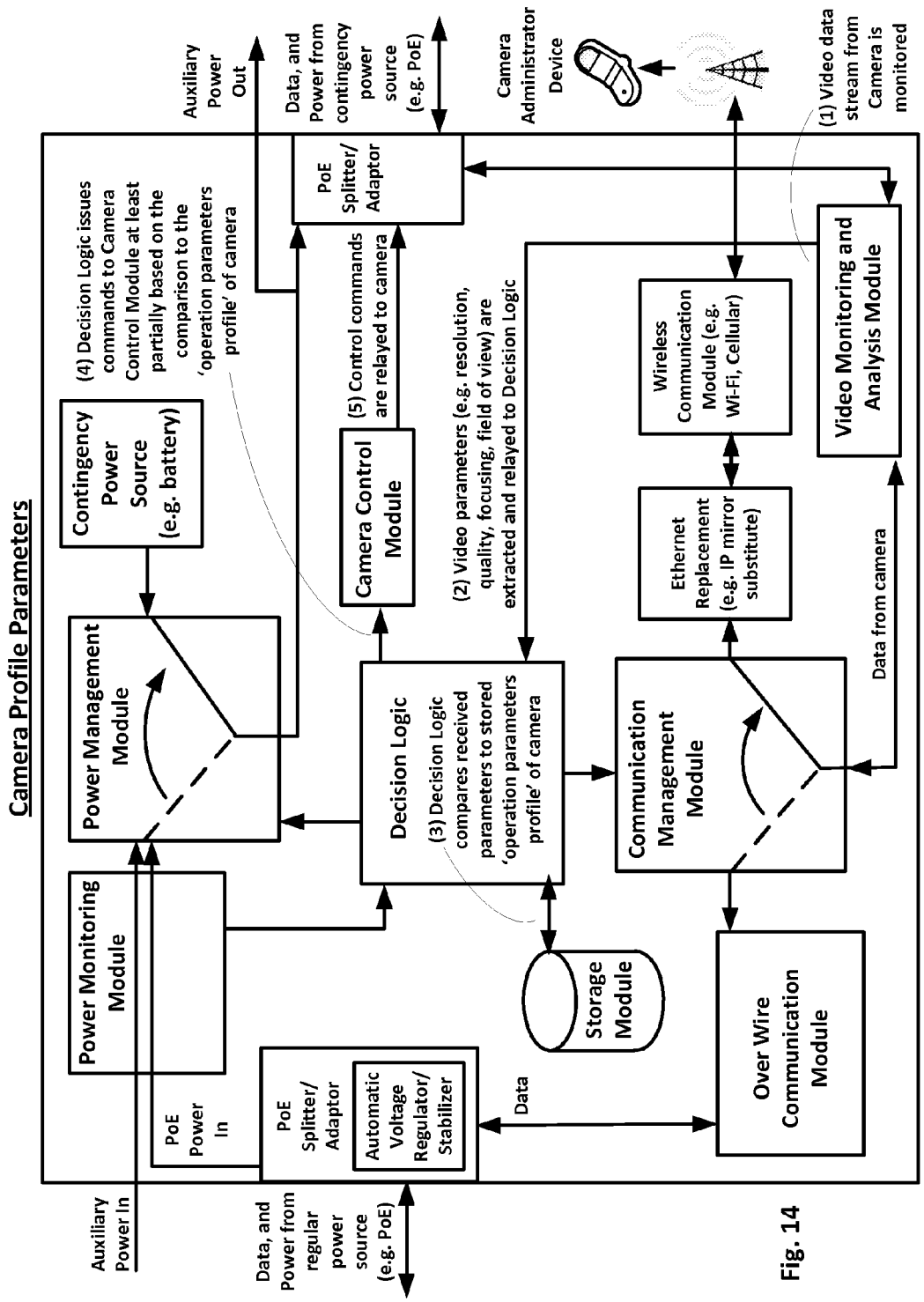
FIG. 14 is a block diagram showing the main modules and operation steps of an exemplary system for facilitating network camera backup, wherein control commands, based on a comparison between video parameters extracted from a monitored video data stream of a camera and an 'operation parameters profile' of that camera, are relayed to the camera, in accordance with some embodiments of the present invention.

In FIG. 14 there are shown, in accordance with some embodiments of the present invention, the main modules and operation steps of an exemplary system/apparatus for facilitating network camera backup, wherein control commands, based on a comparison between video parameters extracted from a monitored video data stream of a camera and an 'operation parameters profile' of that camera, are relayed to the camera.

Zero Power Drop

Figure 15:
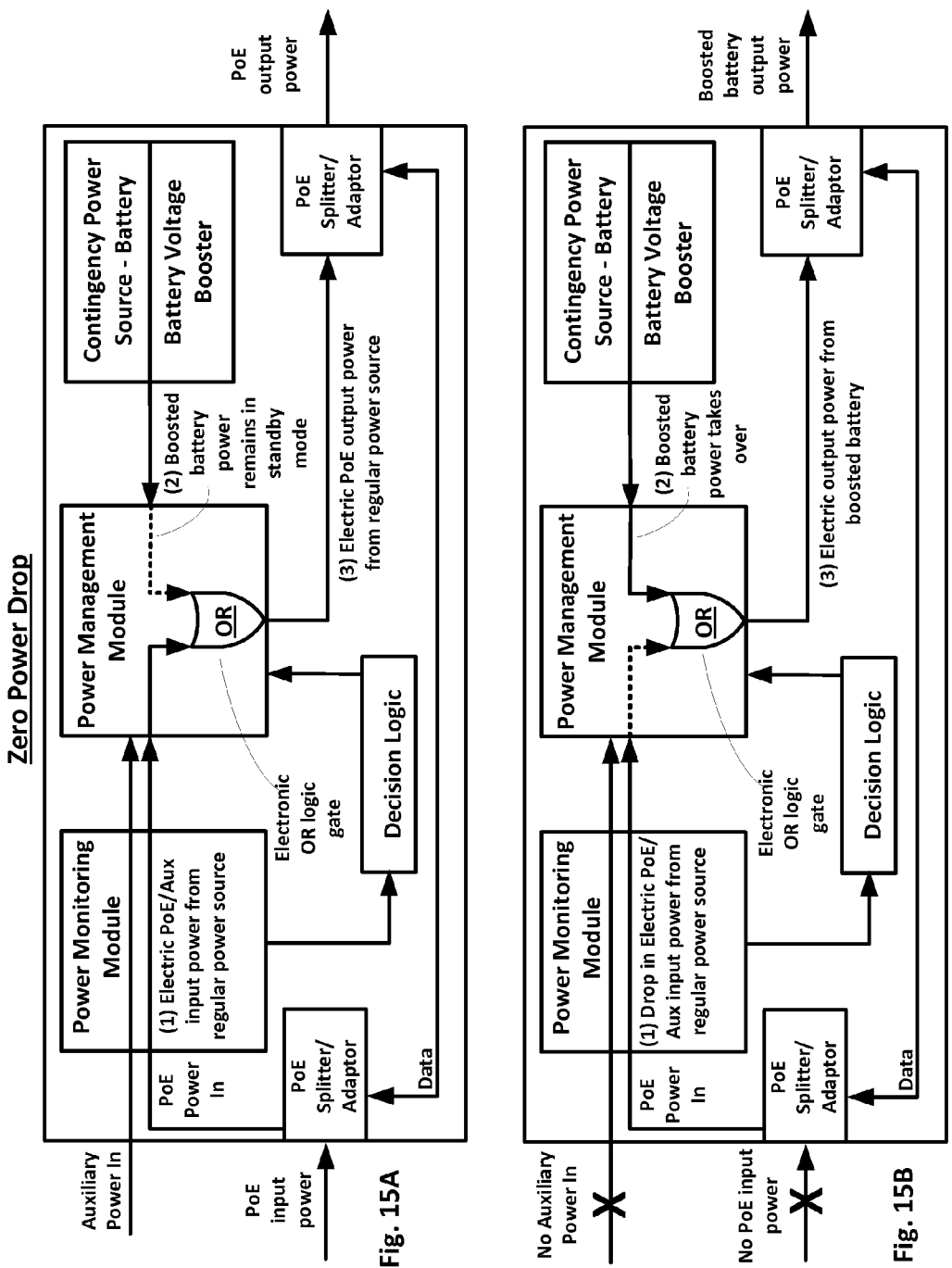
FIGS. 15A and 15B are block diagrams showing the main modules and operation steps of an exemplary system for facilitating network camera backup, wherein an Electronic OR logic gate switches between boosted battery power (15B) and PoE input power (15A), in accordance with some embodiments of the present invention.

According to some embodiments of the present invention, power from a Contingency Power Source, such as a battery, may be repetitively boosted by a Battery Voltage Booster, while remaining in a standby mode (FIG. 15A). A drop in electric PoE input power may trigger an Electronic OR Logic Gate to switch from the PoE input power to the boosted Contingency Power Source (FIG. 15B). According to some embodiments, the power may be substantially instantly switched such that no, or only negligible, power drop is 'felt' by the power supplied camera and/or edge device.

In FIGS. 15A and 15B there are shown, in accordance with some embodiments of the present invention, the main modules and operation steps of an exemplary system/apparatus for facilitating network camera backup, wherein an Electronic OR logic gate switches between boosted battery power (15B) and PoE input power (15A).

Media Adaptors

Figure 16:
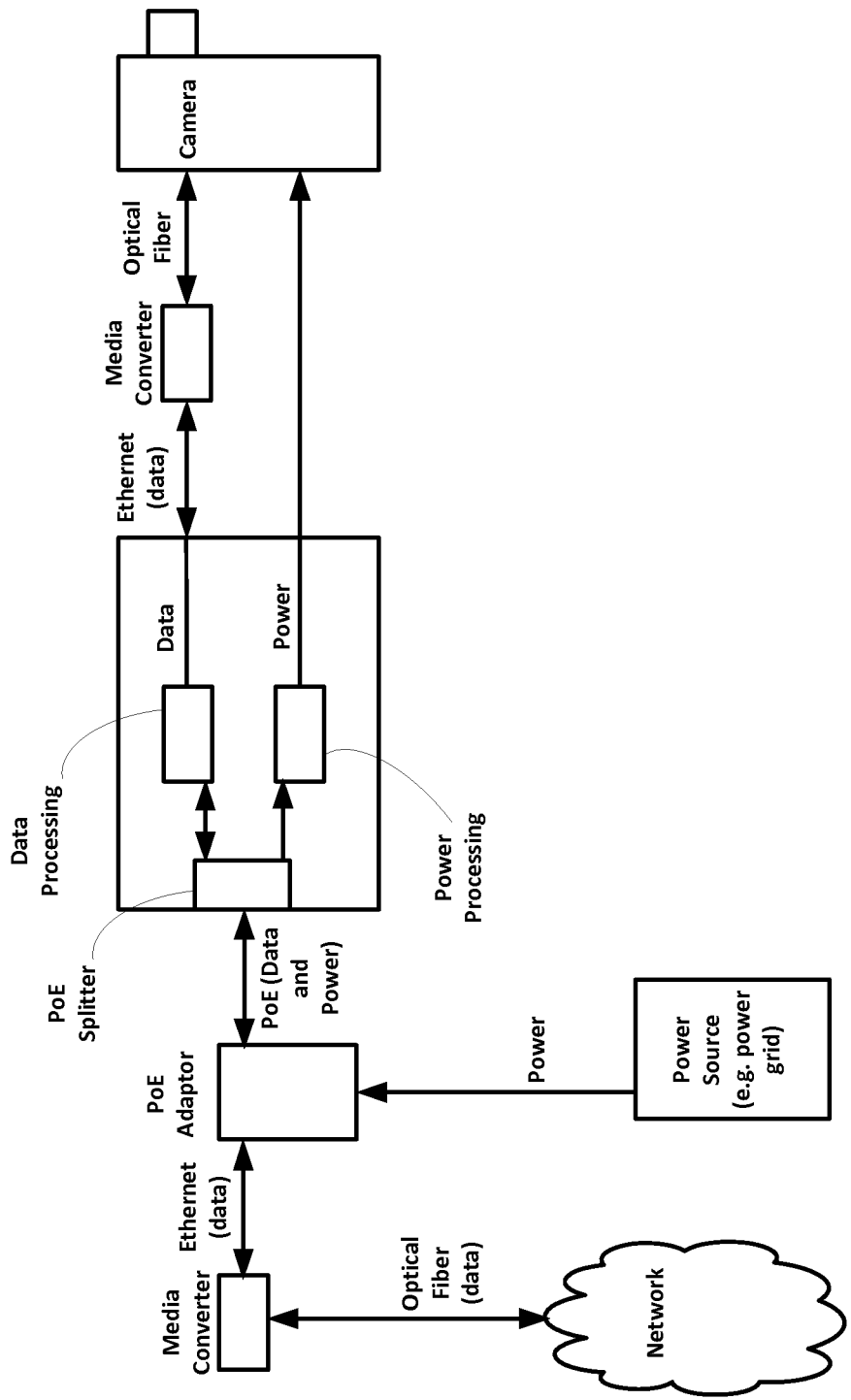
FIG. 16 is a block diagram showing the main modules and operation steps of an exemplary system for facilitating network camera backup, wherein media converters are used for switching system data communications from one cable medium to another, in accordance with some embodiments of the present invention.

In FIG. 16 there are shown, in accordance with some embodiments of the present invention, the main modules and operation steps of an exemplary system/apparatus for facilitating network camera backup, wherein media converters are used for switching system data communications from one cable medium to another.

Operation Flow

Figure 17:
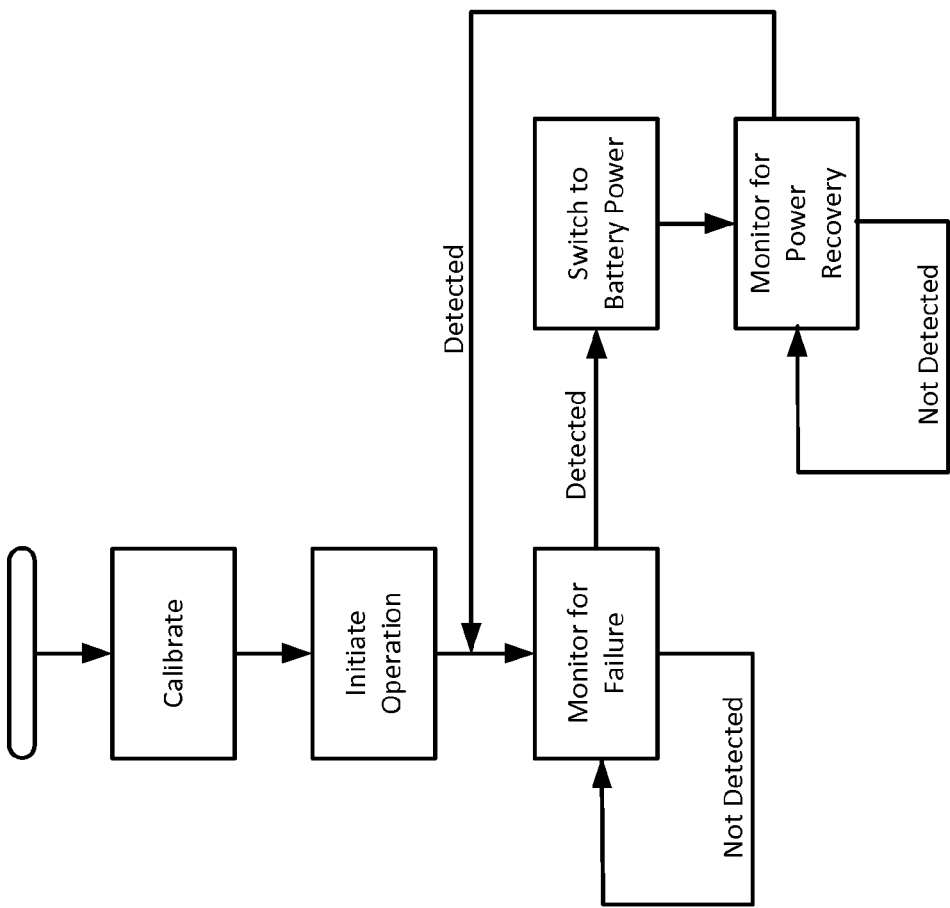
FIG. 17 is a flowchart showing the main operation steps of an exemplary apparatus for facilitating network camera backup, in accordance with some embodiments of the present invention.

In FIG. 17 there are shown, in accordance with some embodiments of the present invention, the main method operation steps executed by an exemplary system/apparatus for facilitating network camera backup.

System Configuration

Figure 18:
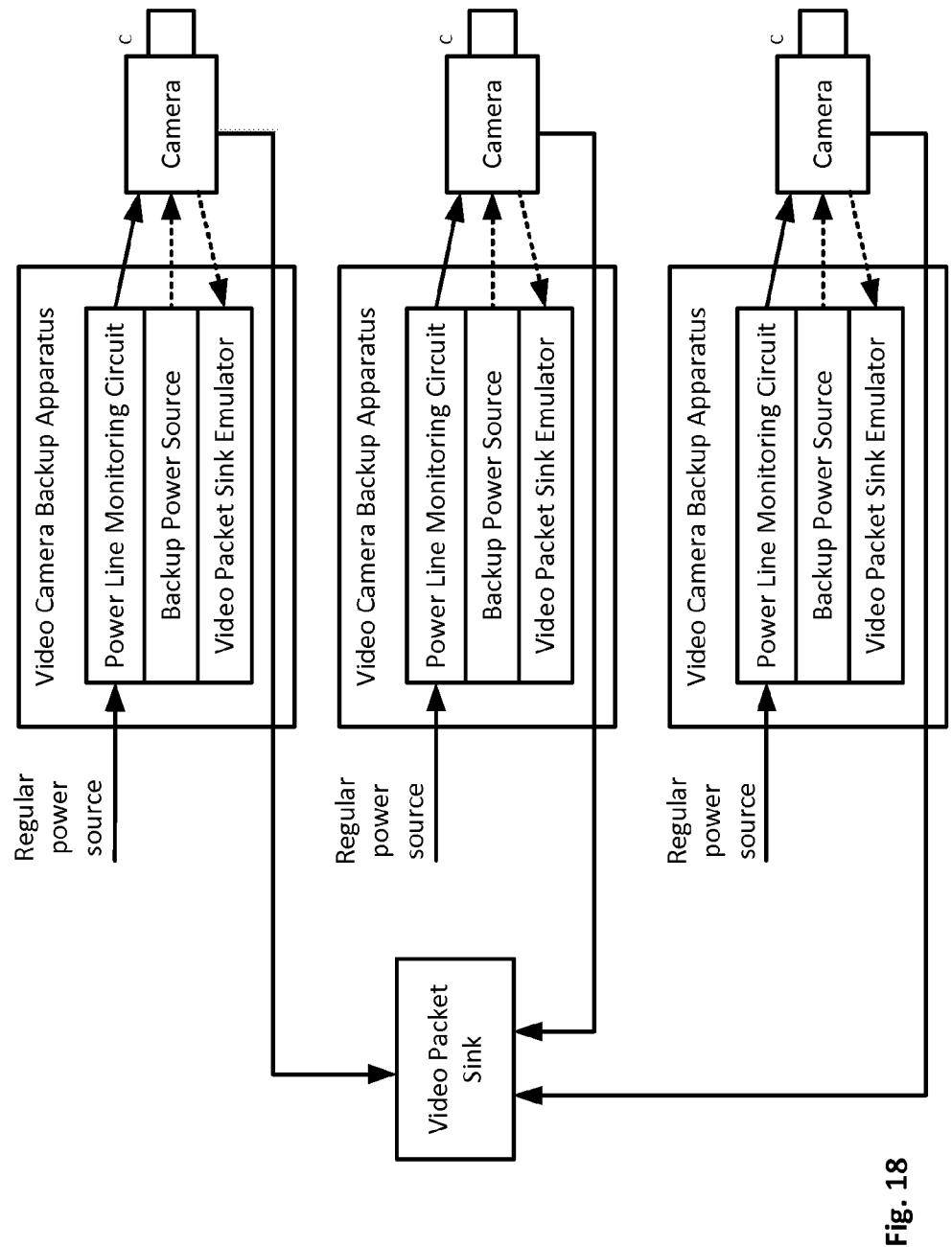
FIG. 18 is a block diagram showing the main modules and components of an exemplary system configuration for facilitating network camera backup, in accordance with some embodiments of the present invention.

In FIG. 18 there are shown, in accordance with some embodiments of the present invention, the main modules, components and relations of an exemplary system configuration for facilitating network camera backup.

According to some embodiments of the present invention, a video camera backup apparatus may comprise: a camera power-line monitoring circuit to detect an inoperable electrical power condition (IEPC) on the power-line; a backup power source to provide electrical power to the camera upon detection of an IEPC; and a video packet sink emulator adapted to emulate a video packet sink of the video camera upon detecting a connectivity fault between the video camera and the video packet sink.

According to some embodiments, an IEPC may include one or more conditions from the group consisting of: (1) power down, and/or (2) power drop. According to some embodiments, the power-line may be a Power over Ethernet (PoE) power-line. According to some embodiments, detection of power-loss on the PoE may indicate a connectivity fault between the video camera and the video packet sink. According to some embodiments, detection of power-loss on the PoE may trigger the video packet emulator to emulate the video packet sink. According to some embodiments the sink emulator may include a digital data storage medium. According to some embodiments, the sink emulator may include a connectivity fault detector. According to some embodiments, the backup power source may be a rechargeable battery, and power from the PoE line may be used to charge the rechargeable battery. According to some embodiments, an auxiliary backup power source may act as an alternative backup source to provide electrical power to the camera upon detection of an IEPC.

According to some embodiments of the present invention, a video monitoring system may comprise: one or more video cameras; a video packet sink to receive video packets from each of said one or more video cameras; and a video camera backup apparatus coupled/connected/residing between each of the one or more video cameras and the video packet sink, wherein the backup apparatus may include: (1) a camera power-line monitoring circuit to detect an inoperable electrical power condition (IEPC) on a camera power-line; (2) a backup power source to provide electrical power to the camera upon detection of an IEPC; and/or (3) a video packet sink emulator adapted to emulate a video packet sink of the video camera upon detecting a connectivity fault between the video camera and the video packet sink.

According to some embodiments, an IEPC may include one or more conditions from the group consisting of: (1) power down, and/or (2) power drop. According to some embodiments, the power-line may be a Power over Ethernet (PoE) power-line. According to some embodiments, detection of power-loss on the PoE may indicate a connectivity fault between the video camera and the video packet sink. According to some embodiments, detection of power-loss on the PoE may trigger the video packet emulator to emulate the video packet sink. According to some embodiments, the sink emulator may include a digital data storage medium. According to some embodiments, the sink emulator may include a connectivity fault detector.

According to some embodiments of the present invention, an edge device power backup apparatus may comprise: a PoE line to charge a backup battery; a PoE line monitoring circuit to detect an inoperable electrical power condition (IEPC) on the PoE line; and/or the backup battery to provide electrical power via PoE to the PoE edge device upon detection of an IEPC. According to some embodiments, the apparatus may further comprise a packet sink emulator adapted to emulate a packet sink of the edge device upon detection of an IEPC. According to some embodiments, an IEPC may include one or more conditions from the group consisting of: (1) power down, and/or (2) power drop. According to some embodiments, detection of power-loss on the PoE may indicate a connectivity fault between the edge device and the edge device packet sink. According to some embodiments, detection of power-loss on the PoE may trigger the packet sink emulator to emulate the packet sink. According to some embodiments, the sink emulator may include a digital data storage medium.

According to some embodiments of the present invention, an edge device power backup apparatus may comprise: a PoE line to charge a backup battery; a PoE line monitoring circuit to detect an inoperable electrical power condition (IEPC) on the PoE line; a battery voltage booster to repetitively boost the voltage of said backup battery; and an electronic OR logic gate to switch from the PoE line input power to the boosted power of said backup battery, upon detection of an IEPC.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A video camera power backup apparatus comprising:
   a Power over Ethernet (PoE) adapter to receive and connect to a Direct Current (DC) PoE power line originating at a PoE source and further adapted to output: (i) an internal power line carrying power received through the PoE power line and (ii) a data line carrying data received from the PoE source;
   a PoE output adapter connected to said internal power line and to said data line and adapted to provide a PoE output line to the video camera, wherein the PoE output line carries data received through said data line and power received through said internal power line;
   a power-line monitoring circuit to detect an inoperable electrical power condition (IEPC) in the PoE power line;
   a rechargeable backup power source adapted to provide electrical power to the PoE output line upon detection of the IEPC in the PoE power line; and
   a charger connected to said internal power line and said backup power source and adapted to charge said backup power source using power from said internal power line.

2. The apparatus according to claim 1, wherein an IEPC includes one or more conditions from the group consisting of: (1) a power down, and (2) a power drop.

3. The apparatus according to claim 1, further comprising a video packet sink emulator adapted to emulate a video packet sink of the video camera.

4. The apparatus according to claim 3, wherein detection of an IEPC triggers said video packet sink emulator to emulate the video packet sink.

5. The apparatus according to claim 3, wherein said sink emulator includes a digital data storage medium.

6. The apparatus according to claim 3, wherein said sink emulator includes a connectivity fault detector.

7. The apparatus according to claim 1, wherein the backup power source is a rechargeable battery and power from the PoE line is used to charge said rechargeable battery.

8. The apparatus according to claim 1, further comprising an auxiliary backup power source acting as an alternative backup source to provide electrical power to the camera upon detection of an IEPC.

9. A video monitoring system comprising:
   one or more video cameras;
   a video packet sink to receive video packets from each of said one or more video cameras; and
   a video camera power backup apparatus residing between one or more of said video cameras and said video packet sink, said power backup apparatuses comprising:
   (1) a Power over Ethernet (PoE) adapter to receive and connect to a Direct Current (DC) PoE power line originating at a PoE source and further adapted to output: (i) an internal power line carrying power received through the PoE power line and (ii) a data line carrying data received from the PoE source;
   (2) a PoE output adapter connected to said internal power line and to said data line and adapted to provide a PoE output line to said video cameras, wherein the PoE output line carries data received through said data line and power received through said internal power line;
   (3) a power-line monitoring circuit to detect an inoperable electrical power condition (IEPC) in the PoE power line;
   (4) a rechargeable backup power source adapted to provide electrical power to the PoE output line upon detection of an IEPC in the PoE power line;
   (5) a charger connected to said internal power line and said backup power source and adapted to charge said backup power source using power from said internal power line; and
   (6) a video packet sink emulator adapted to emulate said video packet sink upon detecting a connectivity fault between an associated video camera and said video packet sink.

10. The system according to claim 9, wherein an IEPC includes one or more conditions from the group consisting of: (1) power down, and (2) power drop.

11. The system according to claim 9, wherein detection of power-loss on the PoE indicates a connectivity fault between the video camera and the video packet sink.

12. The system according to claim 9, wherein detection of an IEPC triggers said video packet sink emulator to emulate the video packet sink.

13. The system according to claim 9, wherein said sink emulator includes a digital data storage medium.

14. The system according to claim 9, wherein said sink emulator includes a connectivity fault detector.

15. An edge device power backup apparatus comprising:
   a Power over Ethernet (PoE) adapter to receive and connect to a Direct Current (DC) PoE power line originating at a PoE source and further adapted to output: (i) an internal power line carrying power received through the PoE power line and (ii) a data line carrying data received from the PoE source;
   a PoE output adapter connected to said internal power line and to said data line and adapted to provide a PoE output line to the edge device, wherein the PoE output line carries data received through said data line and power received through said internal power line;
   a power monitoring circuit to detect an inoperable electrical power condition (IEPC) in the PoE power line;
   a rechargeable backup power source adapted to provide electrical power, via said PoE output line, to the PoE edge device, upon detection of the IEPC; and
   a charger connected to said internal power line and said backup power source and adapted to charge said backup power source using power from said internal power line.

16. The apparatus according to claim 15, further comprising a packet sink emulator adapted to emulate a packet sink of the edge device upon detection of an IEPC.

17. The apparatus according to claim 15, wherein an IEPC includes one or more conditions from the group consisting of: (1) power down, and (2) power drop.

18. The apparatus according to claim 16, wherein detection of power-loss on the PoE indicates a connectivity fault between the edge device and the edge device packet sink.

19. The apparatus according to claim 16, wherein detection of power-loss on the PoE triggers said packet sink emulator to emulate the packet sink.

20. The apparatus according to claim 16, wherein said sink emulator includes a digital data storage medium.

21. An edge device power backup apparatus comprising:
- a Power over Ethernet (PoE) adapter to receive and connect to a Direct Current (DC) PoE power line originating at a PoE source and further adapted to output: (i) an internal power line carrying power received through the PoE power line and (ii) a data line carrying data received from the PoE source;
- a PoE output adapter connected to said internal power line and to said data line and adapted to provide a PoE output line to the edge device, wherein the PoE output line carries data received through said data line and power received through said internal power line;
- a power monitoring circuit to detect an inoperable electrical power condition (IEPC) in the PoE power line;
- a rechargeable backup power source adapted to provide electrical power, via said PoE output line, upon detection of the IEPC;
- a battery voltage booster to repetitively boost the voltage of said backup power source; and
- an electronic OR logic gate to switch from the internal power line to boosted power of said backup power source, upon detection of an IEPC.

* * * * *